(12) United States Patent
Ahola (10) Patent No.: US 11,316,559 B2
(45) Date of Patent: Apr. 26, 2022

(54) SYSTEM AND METHOD FOR ENABLING A WIRELESS DEVICE TO COMMUNICATE WITH A PORTABLE COMPUTER OVER AN INDUCTIVE LINK

(71) Applicant: Suunto Oy, Vantaa (FI)

(72) Inventor: Tom Ahola, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 14/830,750

(22) Filed: Aug. 20, 2015

(65) Prior Publication Data

US 2016/0072557 A1 Mar. 10, 2016

(30) Foreign Application Priority Data

Sep. 9, 2014 (FI) .................................. 20145788

(51) Int. Cl.
*H04B 5/00* (2006.01)
*H04W 4/00* (2018.01)
*H04W 8/00* (2009.01)
*H02J 5/00* (2016.01)
*F41G 1/34* (2006.01)
*H04W 4/80* (2018.01)
*H04W 84/18* (2009.01)

(52) U.S. Cl.
CPC ......... *H04B 5/0075* (2013.01); *H04B 5/0031* (2013.01); *H04B 5/0037* (2013.01); *H04W 4/80* (2018.02); *H04W 8/005* (2013.01); *H04W 84/18* (2013.01)

(58) Field of Classification Search
CPC .. H04B 5/0075; H04B 5/0031; H04B 5/0037; H04B 5/00; H04W 4/008; H04W 8/005; H04W 76/023; H04W 84/18; H04W 8/00; H04W 76/02; H04W 4/00; H04W 88/06; A61B 5/0002; A61B 5/0006; A61B 5/02438; A61B 2562/08; A61B 5/222
See application file for complete search history.

(56) References Cited

U.S. PATENT DOCUMENTS 5,486,818 A 1/1996 Loponen
5,794,616 A 8/1998 Cochran et al.
(Continued)

FOREIGN PATENT DOCUMENTS

| GB | 2452743 A * | 3/2009 | ............. B63C 11/26 |
| GB | 2518013 A | 3/2015 | |
| WO | WO-2014075860 A2 * | 5/2014 | ............. B63C 11/26 |

*Primary Examiner* — Pablo N Tran
(74) *Attorney, Agent, or Firm* — Laine IP Oy (57) ABSTRACT

The invention relates to a system and a method for enabling a wireless device to communicate with a portable computer over an inductive link. The portable computer is provided with a receiving unit for receiving data over said inductive link, and with a proximity detector for detecting proximity of a wireless device sending data over said inductive link. The processing of the data sent from the wireless device in said portable computer is enabled by a signal indicating a detected proximity of said wireless device. The portable computer may be a dive computer which includes a receiver unit capable of receiving sensor information from a pressure sensor an inductive link, and a proximity detector capable of sensing the proximity of the pressure sensor over the inductive link.

23 Claims, 3 Drawing Sheets

(56) References Cited

U.S. PATENT DOCUMENTS

| | | | | |
|---|---|---|---|---|
| 6,125,080 A * | 9/2000 | Sonnenschein | B63C 11/02 | 367/134 |
| 6,418,394 B1 * | 7/2002 | Puolakanaho | A61B 5/0002 | 600/523 |
| 6,424,820 B1 * | 7/2002 | Burdick | H04B 5/0081 | 455/132 |
| 6,856,578 B2 * | 2/2005 | Magine | B63C 11/26 | 367/134 |
| 7,657,255 B2 * | 2/2010 | Abel | H04B 5/06 | 455/414.1 |
| 7,711,322 B2 * | 5/2010 | Rhodes | H04B 13/02 | 340/850 |
| 7,863,859 B2 * | 1/2011 | Soar | F41H 1/02 | 320/108 |
| 8,009,517 B2 * | 8/2011 | Irie | H04B 11/00 | 367/131 |
| 8,094,518 B2 * | 1/2012 | Fleming | H04B 13/02 | 340/850 |
| 8,432,261 B2 * | 4/2013 | Talty | H04W 4/21 | 340/10.51 |
| 8,850,045 B2 * | 9/2014 | Berg | H04L 63/08 | 709/225 |
| 9,225,435 B2 * | 12/2015 | Rahkonen | H04B 11/00 | |
| 9,235,241 B2 * | 1/2016 | Newham | G06F 1/1694 | |
| 9,270,387 B2 * | 2/2016 | Wolfe | H04B 13/02 | |
| 9,331,495 B2 * | 5/2016 | Soar | F41G 1/34 | |
| 9,503,202 B2 * | 11/2016 | Cahalan | H04B 13/02 | |
| 9,866,340 B2 * | 1/2018 | Ahola | H04B 13/02 | |
| 10,179,635 B2 * | 1/2019 | Erikson | B63C 11/12 | |
| 10,227,116 B2 * | 3/2019 | Lindman | B63C 11/22 | |
| 10,227,117 B2 * | 3/2019 | Easterling | B63C 11/26 | |
| 2003/0065536 A1 * | 4/2003 | Hansen | A61B 5/14532 | 705/2 |
| 2006/0224048 A1 * | 10/2006 | Devaul | A61B 5/0024 | 600/300 |
| 2007/0202807 A1 * | 8/2007 | Kim | H04B 5/0062 | 455/41.2 |
| 2008/0146265 A1 * | 6/2008 | Valavi | G06F 1/1626 | 455/550.1 |
| 2009/0279389 A1 * | 11/2009 | Irie | G01S 7/003 | 367/118 |
| 2010/0130123 A1 | 5/2010 | Lindman | | |
| 2010/0003829 A1 | 8/2010 | Granqvist et al. | | |
| 2010/0201201 A1 * | 8/2010 | Mobarhan | H02J 50/50 | 307/104 |
| 2010/0203829 A1 * | 8/2010 | Granqvist | A61B 5/0002 | 455/41.1 |
| 2010/0299073 A1 * | 11/2010 | Metzler | B63C 11/02 | 702/19 |
| 2011/0031928 A1 * | 2/2011 | Soar | H02J 50/12 | 320/108 |
| 2011/0125063 A1 * | 5/2011 | Shalon | A61B 5/0006 | 600/590 |
| 2014/0048069 A1 * | 2/2014 | Fattah | A62B 9/006 | 128/204.21 |
| 2015/0341973 A1 * | 11/2015 | El-Hoiydi | H04W 4/206 | 455/3.06 |
| 2016/0259029 A1 * | 9/2016 | Jukkala | B63C 11/02 | |
| 2017/0050710 A1 * | 2/2017 | Gerges | B63C 11/02 | |

* cited by examiner

SYSTEM AND METHOD FOR ENABLING A WIRELESS DEVICE TO COMMUNICATE WITH A PORTABLE COMPUTER OVER AN INDUCTIVE LINK

FIELD OF THE INVENTION

The invention relates to communication between electronic devices. In particular, the invention relates to configuring e.g. a diving communication system utilizing magnetic inductive coupling for communication of sensor data between devices. The invention also relates to a system and method for pairing devices using magnetic inductive coupling.

BACKGROUND OF THE INVENTION

During a dive, the diver needs to know the pressures of his or her gas tanks. A convenient way of showing the pressures to the diver is to communicate the pressures from each tank to a wearable diving computer attached to the divers' wrist, for example. In modern systems, pressure information is sent wirelessly from a tank sensor unit to the diving computer. This enables the dive computer to display and log the gas tank pressure from the correct tank during the dive. The process of mapping a wireless tank pressure sensor to a diving gas configured in a dive computer is called pairing. There may be several gases configured in the computer with separate tank pressure sensors mapped to them.

Especially under water it is preferred to use relatively low frequencies for communication, for example 5.3 or 123 kHz with magnetic loop antennas working in the near field range. This is practical in diving applications where the signal is required to travel in water the necessary distance of 1-2 m from a gas bottle to a wristop computer. In addition to radio-frequency data transfer, the terms inductive, or magnetic-pulse transmission are used. In water electro-magnetic waves are greatly attenuated, increasingly with higher frequencies. However, the magnetic component is not attenuated by water. Thus, a magnetic loop antenna is the most efficient antenna to be used underwater. By using a ferrite material as a core for the coil forming the loop, the size of the antenna can be greatly reduced. The magnetic loop antenna arrangement can be viewed as a mutual inductance where a magnetic field is generated by the transmit antenna and a voltage is accordingly induced in the receiver antenna. The terms inductive link and inductive coupling is therefore used throughout in this disclosure. The inductive coupling between two coils is dependent on the orientation of the coils. In certain orientations the coupling might be lost or greatly attenuated. To improve the system two or more coils can be used in a geometric arrangement that enables inductive coupling in any orientation of the device. A communication system may be uni- or bidirectional. A bidirectional communication system typically includes a transmitter and a receiver. A bidirectional inductive link may be implemented using the same magnetic loop antenna for receiving and transmitting by switching the said antenna either to the receiver circuit or transmitter circuit. A bidirectional inductive link may be also implemented using the same ferrite core for receiving and transmitting but having separate windings for each case. A bidirectional inductive link may be also implemented using separate magnetic loop antennas for transmitting and receiving.

U.S. Pat. No. 8,275,311 disclose a method of the above-mentioned kind. In the method, the pressure of a gas tank is measured and the pressure data is transmitted under water using a low first frequency to a diving computer. On the surface of the water, a second frequency higher than the first frequency is used for two-way telecommunication between the gas tank and the diving computer. However, in the case of several tanks collision of data and following communication problems cannot be avoided.

Wireless bottle-pressure data transfer is disclosed in, among others, U.S. Pat. Nos. 5,392,771 and 5,738,092 and EP patent 0550649. The same technology is also disclosed in FI patent 96380. Data-transfer technology for implementing wireless bottle-pressure data transfer is also disclosed in the U.S. Pat. No. 7,129,835.

The technology disclosed in the aforementioned Finnish publication permits a reasonably rapid data transfer at a low current consumption, which can be repeated frequently without using a great deal of energy. A drawback with this technology is that it does not permit a very large number of identifiers, which fully individuate all the transmitters, as disclosed in EP publication 0550649. The number of identifiers according to the FI publications is large, but not, however, fully individuating, which is absolutely required when measuring a respiratory gas.

On a diving trip or course, a boat may have 10 or more divers on board, with a variety of bottles having different size, nominal pressure, gas content etc. Also if a fairly large code space is reserved for tank identification, it becomes easily occupied to an extent that the dive master needs to be very careful not to mix up anything when assigning tanks to the divers. The tank identifier is provided by the wireless pressure sensor associated with the tank, and it must be checked and compared with the identifiers of the other users, in order to be certain that there is no confusion. Then tank and the identifier of the wireless pressure sensor is manually paired with the diving computer via the user interface, which is an error-prone procedure.

It is also known to pair sensors and dive computers automatically, by first ensuring that there is only one wireless sensor in the range of the dive computer, and then to initiate a search operation from the user interface. The search typically results in a number or code, which may be random, to be displayed to the user, who can then accept the pairing. The environment around the dive computer need to be cleared from all other transmitters, or the sensitivity of the receiver need to be reduced in order to receive signals only from a transmitter brought in close proximity with the dive computer. These various steps is requires much preparation and/or use of the user interface of the dive computer, and still do not totally eliminate the risk of a confusion, e.g. in a workshop or a boat with a lot of equipment piled up close to the users and their dive computers.

There is also the issue problem of that there may be several tanks with attached wireless sensors, all which need to be paired quickly and securely before a team dive, for example. The pairing may be a complex process if performed with equipment according to prior art, as apart from pairing the own tank with the user's own computer, the dive master may want to pair his computer with all tanks going underwater, and also the dive buddies (pairs) may need to pair their computers with each other's tank.

The present application also relates and is applicable to the co-pending British Patent Application No. 2518012, filed on Sep. 2, 2013. There is presented an improved underwater transceiver device, which can be used simultaneously with other similar transceiver devices in order to, among other things, provide a diving gas pressure sensor transceiver device that has the capability to listen to signals of other transceiver devices, and to adjust its own timing of transmitting based on the signals received. The communication is based on magneto-inductive waves, and the transceiver has a communication unit transmitting data in packets according to a timing scheme, for example once every couple of seconds. The timing scheme may for example be adjusted such that the data packets are transmitted in specific time slots in a synchronized relationship with another transmitter. The devices may self-adjust their timing scheme based on signals from similar devices, or they may receive specific adjustment orders from e.g. a diving computer which controls some or all of the transceivers. Such devices may shift between a two-way communication network mode with one or more network master devices, and a one-way self-organizing sensor network mode without a master device. Here, a safe and quick pairing mechanism would be beneficial to establish the underwater network before diving, for example.

There is thus a need for a system for easy and secure configuration of e.g. diving communication equipment, and of a method for pairing devices in such equipment.

SUMMARY OF THE INVENTION

It is an aim of the invention to solve the abovementioned problems and to provide an improved system and method for pairing devices utilizing magnetic inductive coupling for communication. A particular aim is to provide a system and method for pairing wireless sensors with a dive computer.

A proximity detection circuit according to this invention consumes almost no power. It can therefore always be turned on. It is thus seen by the computer as an external switch, which e.g. can activate the dive computer from a low power sleep state. Another example is to initiate the pairing process using the proximity as such as a trigger. There would then be no need to activate the pairing process from a menu or similar, using UI buttons or other means.

The invention concerns a system for enabling a wireless device to communicate with a portable computer over an inductive link, wherein the portable computer is provided with a receiving unit for receiving data over said inductive link, and a proximity detector for detecting proximity of a wireless device sending data over said inductive link, and wherein processing of said data sent from said wireless device is in said portable computer enabled by a signal indicating a detected proximity of said wireless device.

The invention also concerns a method for enabling a wireless device to communicate with a portable computer in over an inductive link, the method comprising the steps of:
sending data from said wireless device over said inductive link to a receiving unit of said portable computer;
detecting proximity of said wireless device by a proximity detector of said portable computer;
processing said data in said portable computer if a signal indicating proximity of said wireless device is detected.

The improvement over previous solutions in usability is significant. The user is no longer required to start a pairing process using buttons or a menu system as the proximity detection can be always turned on: Also, the user is not required to identify the sensor by reading or comparing identification codes printed on the device. To pair e.g. a gas tank with a dive computer the user is only required to move the dive computer in close proximity to the sensor and to press a button to accept that the pairing is to be done. The device identity is validated simply by the physical close proximity to the dive computer. Advantageously, the user may immediately see all relevant information from any compatible pressure sensor and its related gas tank, by bringing the dive computer in close proximity to the pressure sensor. For example, the user can read information from dive buddies tanks by moving his or her dive computer in close proximity to their pressure transmitters. Enabling an easy check of the gas pressures of your fellow divers can be considered an improvement in safety, and certainly a valuable tool for a responsible dive master both before and during a dive.

According to one embodiment, the portable computer includes a display and is adapted to immediately display data received over said inductive link from a proximity-detected wireless device. The wireless device may transmit continuously, or make a "dump" of its data content intermittently. The data may include identification information, sensor information and equipment specifications. The identification codes and other information that is transmitted by a sensor device may be part of the standard communication protocol for payload signaling of the sensor.

According to one important embodiment, the portable computer includes a user interface providing means (a button etc.) for a user to accept pairing of a proximity-detected wireless device with the computer. Additionally, one or more lists of possible parameters or options stored in the memory of the portable computer may be displayed on the display, of which the user selects one from each list. This will commence communication with the wireless device within the range of the inductive link, and the data transmitted from the wireless device is interpreted as set by the chosen parameters.

In practice, the portable computer may be adapted to allow pairing of the wireless device when the time of the detected proximity falls within a period of time when data was received from the same wireless device over said inductive link. So, if data is received on a continuous basis from the wireless device, indicating it is currently working within the operating range, pairing can easily be done by just bringing the two devices to proximity.

The portable computer may be adapted to pair a proximity-detected wireless device, if a code identifying said wireless device is stored in a list of prioritized devices in the memory of said portable computer. Such a list may consist of devices, like sensors, that belong to team members or friends.

In an important embodiment and application of the present invention, the wireless device is a pressure sensor functionally connected to a gas tank. The sensor is transmitting at least pressure data to a dive computer over said inductive link, the dive computer including a receiver unit capable of receiving sensor information from a pressure sensor over the inductive link. It also includes a proximity detector capable of sensing the proximity of the pressure sensor over the same inductive link.

In one embodiment of the invention, the dive computer includes a transmitter unit capable of transmitting an inductive signal. This signal may be an excitation signal for passive tags, e.g. RFID tags, or any other detectable magnetic field. This may be transmitted over the same inductive link using the same circuitry as in a receiving mode, or may be a separate one used only for excitation or activation of the pressure sensor. Upon activation, the pressure sensor will start sending data and receiver unit start receiving pressure information over the inductive link. The proximity detector in the dive computer will then detect and indicate the proximity of the pressure sensor.

In the case of a pressure sensor for a gas tank, the parameters may be one or more of the following: nominal tank pressure, tank volume, gas content.

The dive computer may be adapted to allow proximity detection only above water, or to allow proximity detection above and under water, but to allow pairing of said pressure sensor only above water.

The various embodiments of the inventive system and method are characterized by what is said in the appended claims. The invention is described in detail in the following, by making reference to the following drawings.

DETAILED DESCRIPTION OF EMBODIMENTS

Figure 1:
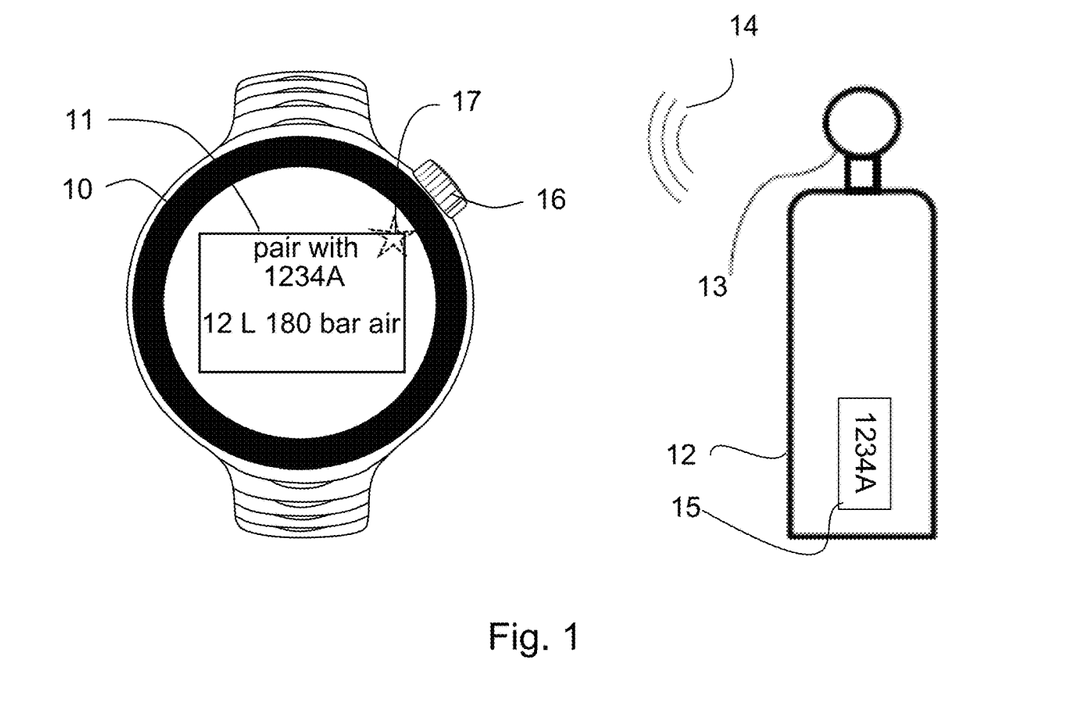
FIG. 1 shows an embodiment of the invention where a dive computer receives information from a wireless device over an inductive link.

FIG. 1 illustrates an embodiment of the present invention, where a portable computer, in this case a dive computer 10, is receiving information from a wireless device 13 over an inductive link 14. In this exemplary case, the wireless device is a pressure sensor mounted on a gas tank 12. The pressure sensor may be mounted with a spacer between the connector for the breathing regulator (not shown) and the tank valve, thus receiving pressure information via the opened valve of the gas tank, an arrangement well known in the art. The dive computer 10 is provided with a receiving unit for receiving the data the said inductive link 14, and with a proximity detector (see FIG. 3) for detecting the proximity of the pressure sensor 13. Inductive coil and loop circuits aimed at creating oscillating magnetic fields, here called an inductive link, are as such well known in the art and are widely used for metal detection, low-power data transmission, to energize implantable microelectronic devices by inductive power transmission, to recharge batteries, and for energy harvesting.

When proximity is detected, as is the case in FIG. 1, data sent from the pressure sensor is displayed on the display 11 of the dive computer 10. For example, the data may include an identification code of the sensor or the tank (1234A), the volume of the tank (12 litres), the current pressure (180 bar) and the gas type (air). This information may be entered or programmed in the memory of the pressure sensor when the tank is filled and serviced. If the sensor is personal and is used with a diver's particular tank, only the tank pressure changes, and no manual data entering to the sensor is required. In this case, the identification code 15 of the tank may be clearly visible on the tank itself as shown in FIG. 1, making it easy for the user or dive master to double-check that the dive computer is reading the correct tank. Alternatively, a readable code (not shown) may reside on the sensor, whereby the sensor carries the permanent ID code and may be attached to and will work with any tank, as soon as the tank data is entered into the memory of the wireless sensor device.

In addition, if the diver is preparing for the dive and intends to use the tank himself during the dive, it should be paired with his dive computer in order to continuously receive and show the tank pressure information from the pressure sensor 13. Once paired, the wireless pressure sensor transmits tank pressure data to the dive computer within the range, typically a few metres, of said inductive link. The transmission may be periodic, e.g. every few seconds, or continuous. The design choice regarding the transmission mode is among other things affected by energy conserving concerns, as sending data at high rates over an inductive link is energy consuming. Here, the frequency of the inductive link may be e.g. 123 kHz. The modulation method of the inductive link 14 may be e.g. BPSK (Binary phase-shift keying), which is robust and the use of which is well known to one skilled in the art.

In FIG. 1 is also shown by example a possible pairing arrangement. The display 11 show the text "pair with 1234A", along with a sign 17 (here a blinking star), that shows which button 16 the user should to press to effect the pairing. Here is only one button shown, dive computers typically have four or more buttons spaced along the rim of their casing. In case of a touch screen type interface, the appropriate button would of course be highlighted or otherwise marked. If pairing is to be performed, the dive computer needs to know one or more tank parameters of the planned diving. The same parameters may naturally be entered as input information when planning the dive. However, not all dives are planned in advance in a dive computer, the tank or its content may change before or during the dive, so a user is often required to check (and pair) his or her tank just before jumping into the water.

Also and obviously, it may according to the invention be possible to pair more than one wireless sensor with the same portable computer. For example, a dive master may want to pair his dive computer with a beginner's tank, in order to be able to follow the beginner's air consumption proactively, which may be considerably higher than that of an experienced diver.

Figure 2:
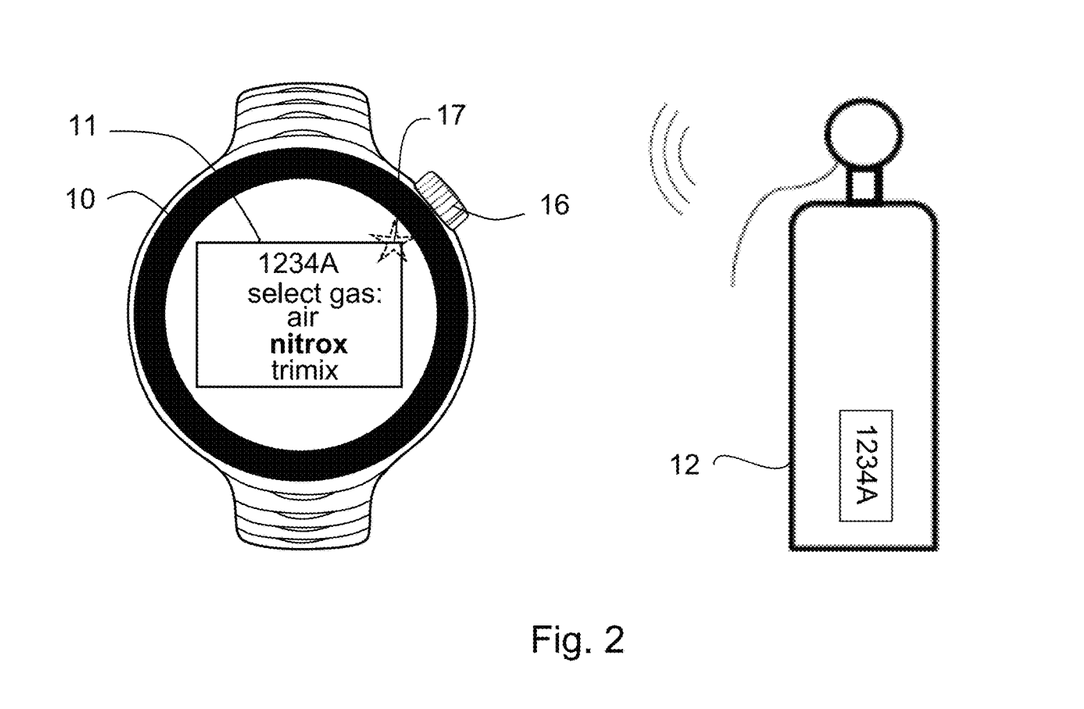
FIG. 2 illustrates a parameter selection process in a dive computer according to FIG. 1.

Referring now to FIG. 2, the dive computer 10 displays a gas list, as a step following the event of the user has pressed button 16 in order to pair the devices. The list may contain any number of different breathing gases, the user interface of the dive computer should then allow the user to scroll the list for the correct alternative. In FIG. 2, we assume the gas content of the tank is only parameter to be chosen. The current choice "nitrox" is marked with bold, so if the user now would press button 16 again, nitrox would be selected as the diving gas, and pairing of the tank 12 and the dive computer 10 would be complete.

More generally, a portable computer may according to the invention be adapted to perform pairing with a wireless device by assigning to said device more than one parameter (e.g. not only the diving gas), from a list of parameters stored in the memory of the inventive portable computer.

Figure 3:
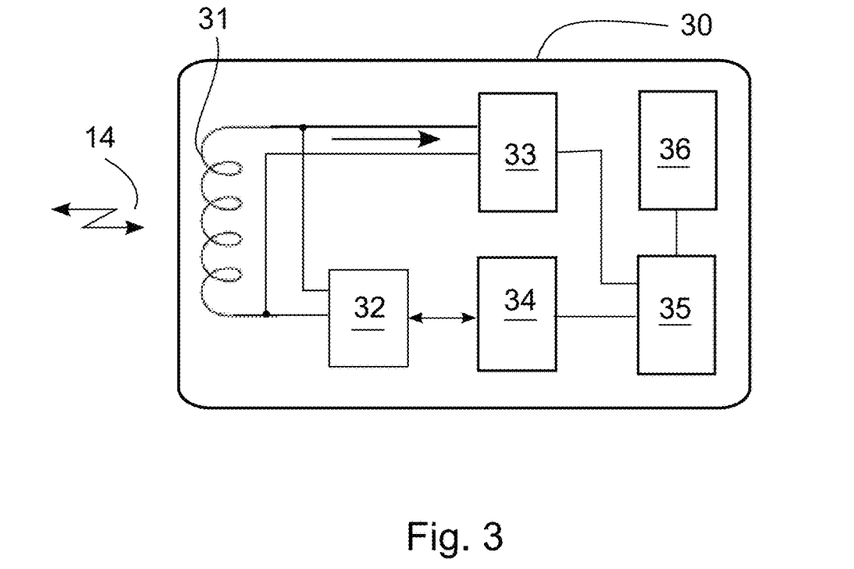
FIG. 3 shows a block diagram of an embodiment of an inventive portable computer.

FIG. 3 illustrates in more detail the components of a dive computer 30 according to an embodiment of the present invention. The computer 30 comprises one or several coils 31, advantageously on a common ferrite core. Typically one coil would be used for receiving, i.e. sensing a magnetic field over the inductive link 14, and the other coil for transmitting, if such an option is needed.

A magnetic field emitted from an external wireless device over the inductive link 14, like a pressure sensor 13, is detected, as illustrated by the arrow, by a proximity detector unit 33. The detector 33 does not read any payload data, it only detects in this case that a sensor has been brought into proximity with the dive computer. The output of the proximity sensor is connected to a communication unit 35 of the computer, which may include a separate and dedicated communication processor. The communication unit 35 also includes memory for temporary storage of sensor data and for internal software of the dive computer. A central processor 36 is provided for running the operative system of the dive computer and to perform various tasks such as processing diving data, interfacing with internal sensors, providing the overall UI interface and controlling the display, etc. The communication unit and central processor may also be integrated into one circuit or chip.

In block 32, an amplifier is adapted to sense a magnetic field over the same inductive link 14. Block 32 may also provide overvoltage protection, e.g. by a zener-diode/thyristor circuit (not shown). The amplifier in unit 32 feed a receiver unit 34 with sensor data signals received over the inductive link 14. Optionally, units 32 and 34 may be configured for two-way communication, as the bidirectional arrow indicates, i.e. block 34 is in fact a transceiver and block 32 also comprise a driver circuit for drive a transmit current through a transmitter coil 31 in order to generate an oscillating magnetic field. This makes it possible to send information to external devices, as explained below.

As becomes clear from FIG. 3, the proximity detector 33 is according to the present invention separate from transmitters and/or receivers 34 used for signaling payload information, like gas tank pressure information. The proximity detector 33 may be a passive device (e.g. RFID tag) that upon inductive excitation create a response signal to indicate a proximity when e.g. a wireless sensor is close to the portable computer, for example less than 5 centimeters. The proximity detector 33 may share the magnetic loop antenna 31 of the transceiver unit 34, or it may have a separate magnetic loop antenna or another component for detecting a signal from a device in proximity. This magnetic field is advantageously the same field with which the device communicates its payload information to a receiving unit of the portable computer, establishing an inductive link between the devices.

Pressure sensors may be activated in various ways, one method is to activate the sensor when the tank valve is opened. Another method is to "wake up" the sensor externally. According to one embodiment of the invention, this may be done having in the computer 30 a coil 31 and in block 32 a driver circuit that generates a magnetic field which may be sensed over the inductive link 14. If configured suitably or if put in such mode by the user, the dive computer may then continuously or intermittently transmit an inductive signal suitable for activating a passive component in the pressure sensor, e.g. an excitation signal for an RFID tag. A sensor that is brought in proximity with the computer 30 will the feel the activation signal and start the transmission of sensor data. This is detected in the proximity detector of the dive computer over the inductive link as explained. An indicated proximity of the pressure sensor then enables the receiver unit to receive sensor information from the pressure sensor, over the same inductive link as the proximity was sensed.

If a diver using a dive computer, or a person using an inventive portable computer for any purpose, he or she may want to pair the computer with buddies' devices, similarly to what has been explained above in a dive master/beginner situation. Paired devices would be stored in the memory of the portable computer would remain paired, in order to show information from a buddies' sensor on the computer of his or her friend whenever in range, until the devices are un-paired or the connection otherwise edited. An edit mode, that makes un-pairing or editing possible, may be initiated by bringing the devices to proximity. In the case of a diving team, this would for example mean that the user of the computer would receive tank pressure information from a paired "buddy" or diving pair, and be able to display the pressure on the display whenever wanted. A pairing mechanism like this improves security and requires no immediate proximity in order to check the other diver's pressure.

According to the invention, for security or other reasons, the dive computer may allow proximity detection only above water. Alternatively, it may allow proximity detection above and under water, but pairing of the pressure sensor only above water. Any dive computer is usually able to sense and indicate whether it is under or above water, e.g. by an in-built pressure sensor. The inventive dive computer may be separately configurable for above and underwater conditions.

Figure 4:
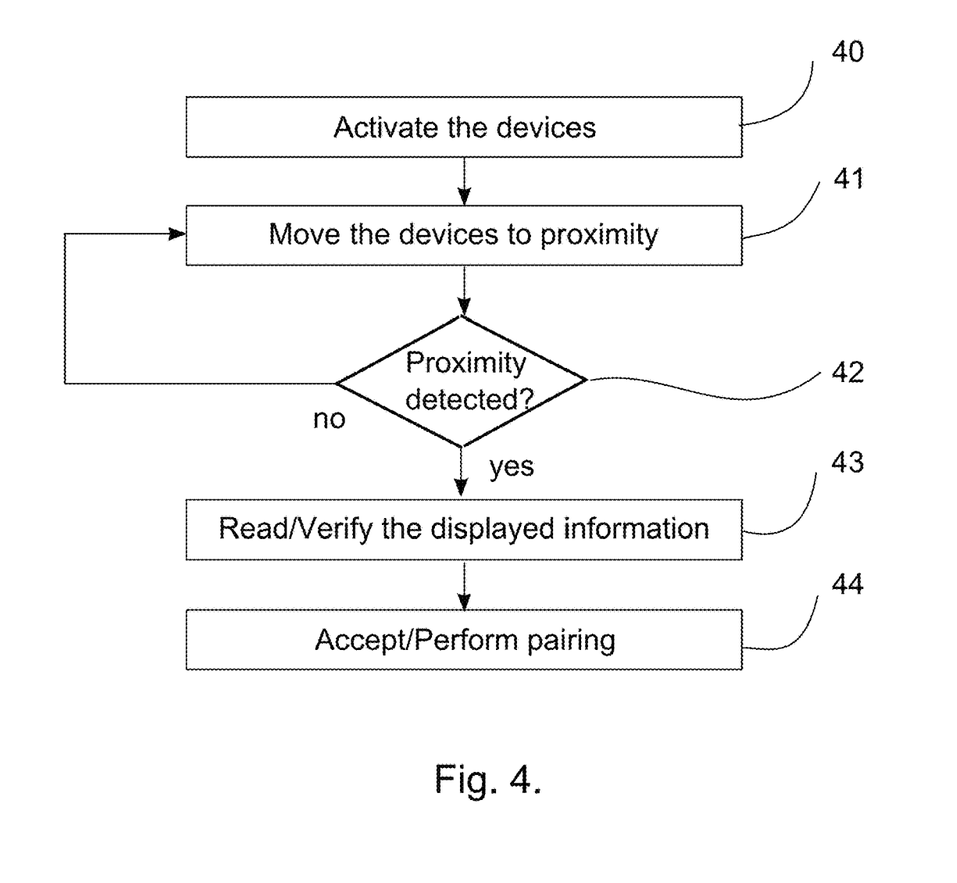
FIG. 4 shows a flow chart of an exemplary inventive method.

FIG. 4 shows a flowchart of an exemplary inventive method.

At 40, the user turns on (activates) the devices. For example, the wireless pressure transmitter might be activated by opening the tank pressure valve, and the dive computer may be activated by a key press.

At 41 the user moves the dive computer close (to proximity) to the wireless pressure sensor, typically to within a few centimeters, or possibly in touch with the sensor. If proximity is detected at 42, the dive computer display information about the pressure transmitter and the attached gas tank as shown in FIG. 1. If proximity is not detected, the user is expected to bring the devices closer to each other, or an error message is displayed concerning the cause of the problem (e.g. low battery etc.)

The information displayed at 43 may include gas pressure, transmitter battery status information, identifier code, serial number, customizable name, temperature, gas type and parameters, tank volume, wireless signal strength and/or other relevant information.

The user can accept the information and perform the pairing at 44 by a key press or another input method.

In one embodiment of the invention, the system may be configured to activate the devices automatically when a proximity condition is detected. In a further embodiment, step 44 may offer an editing mode where the user can give the tank sensor a name, change the gas type, or modify other parameters, such as the tank volume.

Figure 5:
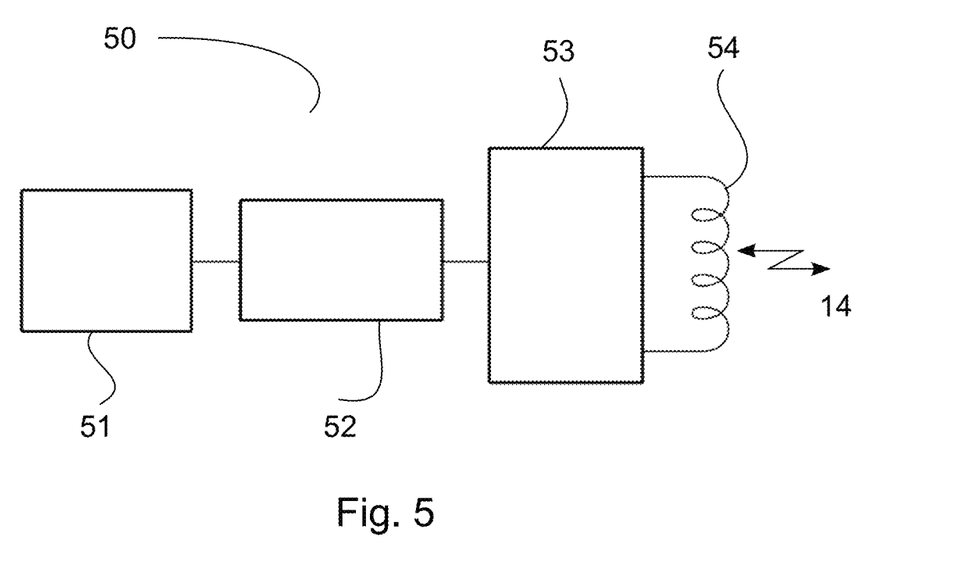
FIG. 5 shows a block diagram of a pressure sensor according to one embodiment of the invention.

Turning now to the block diagram of the wireless sensor 50 in FIG. 5, a pressure sensor 51 is sensing e.g. the pressure in a diver's gas tank. The pressure sensor may be based on any kind of inductive, resistive or capacitive sensing element for any measurable variable of interest. The pressure data signal is fed to a processor 52, for various filtering and amplifying steps. The pressure information signal is then fed to a driver circuit 53 and to a transmitter coil 54, to be sent over the inductive link 14 to the dive computer of FIG. 3, for example. The driver circuit may contain similar transmission circuitry as the circuit blocks 32 and 34 of FIG. 3. If the pressure sensor 50 is intended to be activated externally, e.g. by a dive computer over the inductive link 14, an activation circuit or RFID tag needs to be included e.g. in block 53 to effect the activation of the sensor.

It is to be understood that the embodiments of the invention disclosed are not limited to the particular structures, process steps, or components disclosed herein, but are extended to equivalents thereof as would be recognized by those ordinarily skilled in the relevant arts. It should also be understood that terminology employed herein is used for the purpose of describing particular embodiments only and is not intended to be limiting. Although described in detail in the context of diving equipment, the present invention is industrially applicable in all kinds of sports and applications where proximity is an essential element and sensors need to be read and/or paired with portable computers, such as smartphones, tablet computers, sport computers etc.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the description, numerous specific details provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A system for enabling wireless communication over an inductive link, comprising:
   a portable computer having a memory and a display;
   wherein the portable computer is provided with a receiving unit for receiving data from at least one wireless device over said inductive link and a proximity detector for detecting proximity of said at least one wireless device over said inductive link,
   wherein processing of data sent from said wireless device is in said portable computer enabled by a signal indicating a detected proximity of said at least one wireless device, and
   wherein the portable computer is adapted to immediately display said processed data from a non-paired proximity-detected compatible wireless device on the display of said portable computer.

2. The system according to claim 1, wherein said portable computer includes a user interface providing means for enabling a user to pair a proximity-detected wireless device with said portable computer for communicating with the at least one wireless device within the range of said inductive link periodically or continuously.

3. The system according to claim 2, wherein said portable computer is adapted to allow pairing of said at least one wireless device with said portable computer when the time of the detected proximity falls within a period of time when data was received from said proximity-detected wireless device over said inductive link.

4. The system according to claim 2, wherein said portable computer is adapted to perform pairing of said at least one wireless device if at least one parameter from a list of parameters stored in the memory of said portable computer and relating to properties of said at least one wireless device is selected.

5. The system according to claim 4, wherein said at least one parameter is gas content.

6. The system according to claim 1, wherein said portable computer is adapted to pair a proximity-detected wireless device with said portable computer if a code identifying said at least one wireless device is stored in a list of prioritized devices in the memory of said portable computer.

7. The system according to claim 1, wherein said at least one wireless device is a pressure sensor functionally connected to a gas tank which is transmitting at least pressure data to said portable computer over said inductive link.

8. The system according to claim 1, wherein said portable computer is a dive computer and includes a receiver unit capable of receiving sensor information from a pressure sensor over said inductive link, and a proximity detector capable of sensing the proximity of said pressure sensor over said inductive link.

9. The system according to claim 8, wherein said dive computer is adapted to allow proximity detection only above water.

10. The system according to claim 8, wherein said dive computer is adapted to allow proximity detection above and under water but to allow pairing of said pressure sensor only above water.

11. The system according to claim 1, wherein said portable computer is a dive computer comprising:
    a transmitter unit capable of transmitting an inductive excitation signal,
    a proximity detector capable of sensing a response from a pressure sensor over an inductive link, indicating the proximity of said pressure sensor, and
    a receiver unit capable of receiving sensor information from a pressure sensor over said inductive link.

12. A system according to claim 1, wherein the said immediately displayed processed data is removed from the display when proximity is no longer detected.

13. A method for enabling at least one wireless device to communicate with a portable computer over an inductive link, the method comprising the steps of:
    sending data from said at least one wireless device over said inductive link to a receiving unit of said portable computer;
    detecting, by a proximity detector in said portable computer, over the inductive link, the proximity of the at least one wireless device to the portable computer; and
    processing by said portable computer and immediately displaying on a display of said portable computer said data in response to the detecting of the proximity of the at least one wireless device;
    wherein the portable computer is configured such that data received over said inductive link from a non-paired proximity-detected compatible wireless device is immediately processed and displayed on a display of said portable computer.

14. The method according to claim 13, wherein the method includes the step of having a user to pair a proximity-detected wireless device with said portable computer for periodic or continuous communication with the at least one wireless device within the range of said inductive link.

15. The method according to claim 14, wherein said portable computer allows pairing of said at least one wireless device with said portable computer when the time of the detected proximity falls within a period of time when data was received from said proximity-detected wireless device over said inductive link.

16. The method according to claim 14, wherein said portable computer allows pairing of said at least one wireless device with said portable computer if at least one parameter from a list of parameters, stored in the memory of said portable computer and relating to properties of said at least one wireless device is selected.

17. The method according to claim 13, wherein said portable computer allows pairing of said at least one wireless device with said portable computer if a code identifying said at least one wireless device is stored in a list of prioritized devices in the memory of said portable computer.

18. The method according to claim 13, wherein said at least one wireless device is a pressure sensor functionally connected to a gas tank which is transmitting at least pressure data to said portable computer over said inductive link.

19. The method according to claim 13, wherein said portable computer is a dive computer, said at least one wireless device is a pressure sensor functionally connected to a gas tank, said sensor sending pressure data readable by said dive computer over said inductive link, whereby a proximity detector in said dive computer is capable of sensing the proximity of said pressure sensor over said inductive link.

20. The method according to claim 19, wherein said dive computer is detecting the proximity of said pressure sensor over said inductive link only above water.

21. The method according to claim 19, wherein said dive computer is allowing proximity detection above and under water but allows pairing of said pressure sensor only above water.

22. The method according to claim 13, wherein said portable computer is a dive computer and said at least one wireless device is a pressure sensor functionally connected to a gas tank, and wherein:
  said dive computer is sending an inductive excitation signal detectable by a proximity sensor in said pressure sensor,
  said pressure sensor sending in response to said excitation signal pressure data measured by said pressure sensor that is readable by said dive computer over said inductive link, and
  sensing the proximity of said pressure sensor by a proximity detector in said dive computer over said inductive link.

23. The method according to claim 13, wherein the portable computer is further configured such that said immediately processed and displayed data is removed from the display when proximity is no longer detected.

* * * * *